United States Patent
Mizutani et al.

(10) Patent No.: US 7,248,308 B2
(45) Date of Patent: Jul. 24, 2007

(54) SPREAD ILLUMINATING APPARATUS TO ILLUMINATE TWO LIQUID CRYSTAL DISPLAY PANELS DIFFERENT IN SCREEN SIZE

(75) Inventors: Hitoshi Mizutani, Iwata-gun (JP); Satoshi Kawashima, Iwata-gun (JP); Kazutoshi Takayanagi, Iwata-gun (JP); Katsuji Ishigami, Iwata-gun (JP); Motoji Egawa, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 96 days.

(21) Appl. No.: 10/726,682

(22) Filed: Dec. 4, 2003

(65) Prior Publication Data

US 2004/0145688 A1 Jul. 29, 2004

(30) Foreign Application Priority Data

Jan. 24, 2003 (JP) .............................. 2003-016253
May 12, 2003 (JP) .............................. 2003-132886

(51) Int. Cl.
*G02F 1/1335* (2006.01)
(52) U.S. Cl. .................. 349/67; 362/609; 362/623; 349/65; 349/73; 349/96
(58) Field of Classification Search .................. 349/65, 349/67, 73, 96, 113–115, 63, 61, 62, 74, 69, 349/70; 362/560, 561, 603, 604, 623, 625, 362/626, 602, 609, 611, 615
See application file for complete search history.

(56) References Cited

U.S. PATENT DOCUMENTS

| 5,134,549 | A |   | 7/1992 | Yokoyama |
|---|---|---|---|---|
| 5,521,797 | A |   | 5/1996 | Kashima et al. |
| 5,600,455 | A |   | 2/1997 | Ishikawa et al. |
| 5,764,315 | A |   | 6/1998 | Yokota et al. |
| 5,851,062 | A |   | 12/1998 | Shinohara et al. |
| 5,883,684 | A |   | 3/1999 | Millikan et al. |
| 5,944,405 | A |   | 8/1999 | Takeuchi et al. |
| 6,139,161 | A |   | 10/2000 | Honda et al. |
| 6,239,851 | B1 |   | 5/2001 | Hatazawa et al. |
| 6,243,150 | B1 | * | 6/2001 | Watanabe et al. ............. 349/65 |
| 6,443,585 | B1 | * | 9/2002 | Saccomanno ............... 362/608 |

(Continued)

FOREIGN PATENT DOCUMENTS

JP       A 10-90678       4/1998

(Continued)

*Primary Examiner*—Dung T. Nguyen
*Assistant Examiner*—Thoi V. Duong
(74) *Attorney, Agent, or Firm*—Oliff & Berridge, PLC (57) ABSTRACT

A spread illuminating apparatus includes: at least one light source; a light conductive plate which has the at least one light source disposed at one end surface thereof, and which allows light emitted from the at least one light source and introduced therein to exit out therefrom through both major surfaces thereof toward first and second liquid crystal display elements disposed respectively over the both major surfaces of the light conductive plate, wherein the second liquid crystal display element has a smaller display screen size than the first liquid crystal display element; and a reflecting means which is disposed at the other major surface of the light conductive plate so as to cover at least areas not covered by the second liquid crystal display element, and which reflects light toward the first liquid crystal display element.

10 Claims, 8 Drawing Sheets

U.S. PATENT DOCUMENTS

| | | |
|---|---|---|
| 6,466,292 B1 | 10/2002 | Kim |
| 6,529,250 B1 * | 3/2003 | Murakami et al. ............. 349/5 |
| 6,679,613 B2 * | 1/2004 | Mabuchi .................... 362/600 |
| 6,853,418 B2 | 2/2005 | Suzuki et al. |
| 6,871,975 B2 | 3/2005 | Chuang |
| 6,897,914 B2 | 5/2005 | Yoshida |
| 2003/0063234 A1 | 4/2003 | Oda et al. |
| 2005/0073627 A1 * | 4/2005 | Akiyama .................... 349/65 |

FOREIGN PATENT DOCUMENTS

| | | |
|---|---|---|
| JP | A 2001-067049 | 3/2001 |
| JP | A 2002-189230 | 7/2002 |
| JP | A 2002-372711 | 12/2002 |

* cited by examiner

| | Y | | | Z | |
|---|---|---|---|---|---|
| 19 | 21 | 22 | 24 | 27 |
| 22 | 22 | 23 | 24 | 27 |
| 22 | 22 | 23 | 24 | 26 |
| 22 | 22 | 22 | 24 | 26 |
| 19 | 20 | 21 | 23 | 26 |

# SPREAD ILLUMINATING APPARATUS TO ILLUMINATE TWO LIQUID CRYSTAL DISPLAY PANELS DIFFERENT IN SCREEN SIZE

BACKGROUND OF THE INVENTION

1. Field of the Invention

The present invention relates to a spread illuminating apparatus, and more particularly to a spread illuminating apparatus adapted to illuminate two liquid crystal display panels which are disposed respectively at both major surfaces of a light conductive plate, and which have their respective screen sizes different from each other.

2. Description of the Related Art

Figure 12:
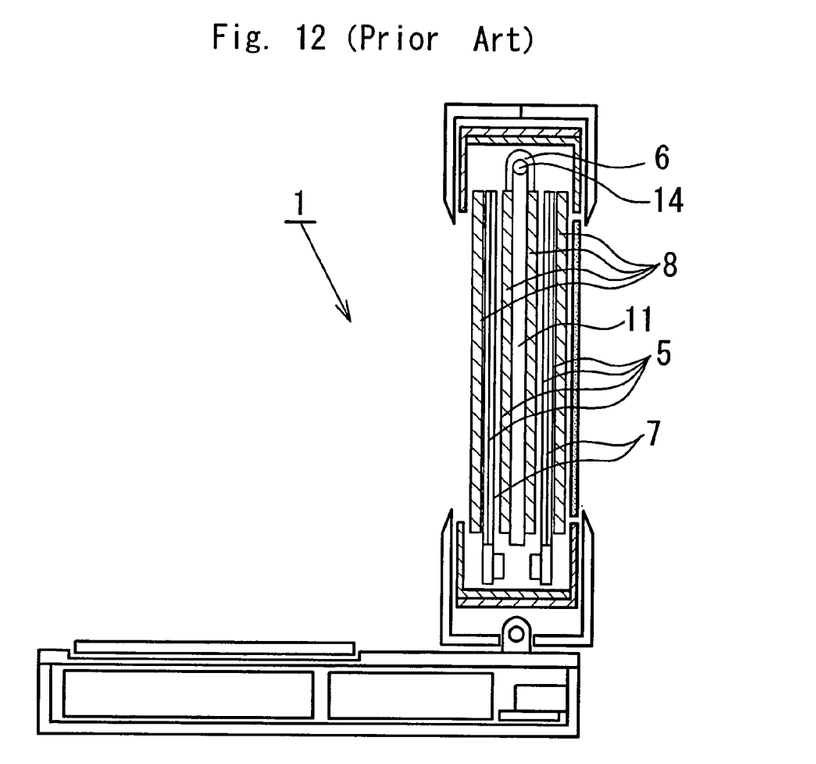
FIG. 12 is a schematic cross sectional view of a conventional spread illuminating apparatus which illuminates two LCD panels having a display screen size equal to each other.

There has been a demand for a display device which has two viewing screens disposed in parallel with each other so as to sandwich an illuminating apparatus, and which is convenient for a situation where an electronics device, such as a notebook personal computer, is operated by a teacher, an instructor or a sales person while pupils, students or customers view images displayed. FIG. 12 is a schematic cross sectional view of a conventional display device for a notebook personal computer, introduced to answer the aforementioned demand. Such a display device is disclosed in, for example, Japanese Patent Application Laid-Open No. H10-90678.

Referring to FIG. 12, a liquid crystal display (LCD) device 1 is foldably attached to a notebook personal computer. The LCD device 1 comprises: a backlight system which comprises a cold-cathode fluorescent lamp 14 as a light source, a light conductive plate 11, and a reflector sheet 6 surrounding the cold-cathode fluorescent lamp 14; and two LCD panels which each comprise a liquid crystal 7, two glass plates 5 sandwiching the liquid crystal 7, and two polarizer sheets 8 placed respectively on the two glass plates 5, and which are bonded respectively to both major surfaces of the light conductive plate 1 of the backlight system. Light emitted from the cold-cathode fluorescent lamp 14 is introduced into the light conductive plate 11 directly and indirectly via the reflector sheet 6 disposed surrounding the cold-cathode fluorescent lamp 14, and exits out entirely from the light conductive plate 11 through the both major surfaces thereby enabling images to be viewed at the both sides of the LCD device 1.

Under the circumstances, in recent years, more and more portable telephones are coming out with a built-in camera, and a person to be photographed, as well as a person to photograph, may want to monitor an image to be photographed from a side opposite to a side of the person to photograph. To meet this request, a display device comprises two LCD panels provided respectively at both sides of the portable telephone. In such a case, the two LCD panels may be different in display screen size, but if this LCD panel arrangement is applied to the LCD device 1 described above with reference to FIG. 12, there arises a problem described below.

Figure 13:
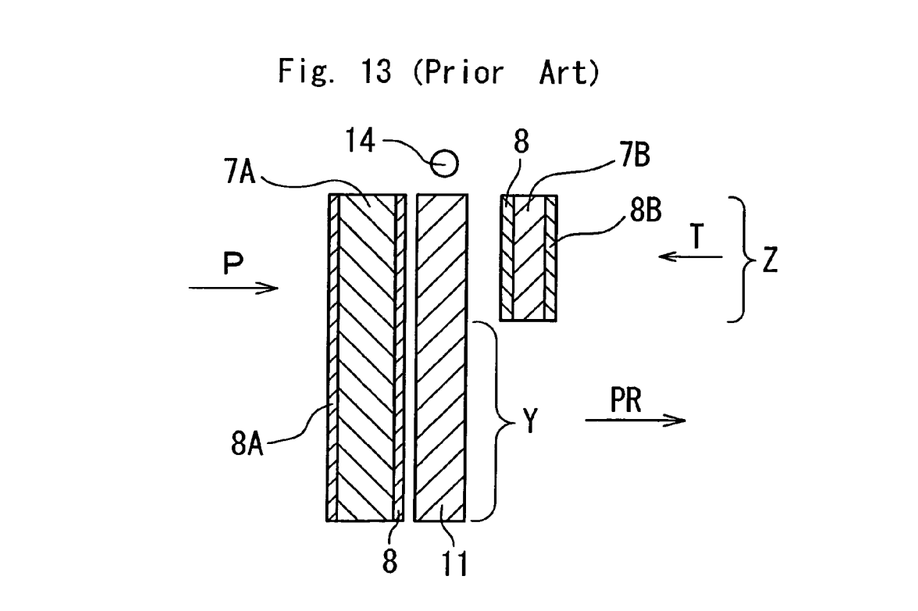
FIG. 13 is a schematic cross sectional view of another conventional spread illuminating apparatus which illuminates two LCD panels having respective display screen sizes different from each other, and explains a problem associated therewith.

Referring to FIG. 13, a person to photograph views one liquid crystal element (LCD panel) 7A from a direction P and a person to be photographed views the other liquid crystal element (LCD panel) 7B from a direction T. Here, the one LCD panel 7A has a larger display screen size than the LCD panel 7B. FIG. 13 also shows a light conductive plate 11, well-known polarizer plates 8, 8A and 8B, and a cold-cathode fluorescent lamp 14. Since the LCD panel 7A is larger than the LCD panel 7B, the light conductive plate 11 defines, on a side toward the LCD panel 7B, an area Y (hereinafter referred to as non-display area) which is not covered by the LCD panel 7B, and an area Z (hereinafter referred to as display area) which is covered by the LCD panel 7B. As shown in FIG. 13, light PR exiting out from the light conductive plate 11 toward the person to be photographed is not utilized at the non-display area Y and gone uselessly, which means wasted electric power of the light source thus having a critical impact on an electronics device, such as a portable telephone, which strongly demands low power consumption.

While light exiting out from the light conductive plate 11 at the non-display area Y is gone uselessly, light exiting out at the display area Z is incident on the LCD panel 7B and partly reflected thereby to be brought back into the light conductive plate 11, and then introduced in the LCD panel 7A to illuminate the LCD panel 7A. As a result, the person to photograph notices difference in brightness over the LCD panel 7A such that an area corresponding to the display area Z is brighter than an area corresponding to the non-display area Y.

Figure 14A:
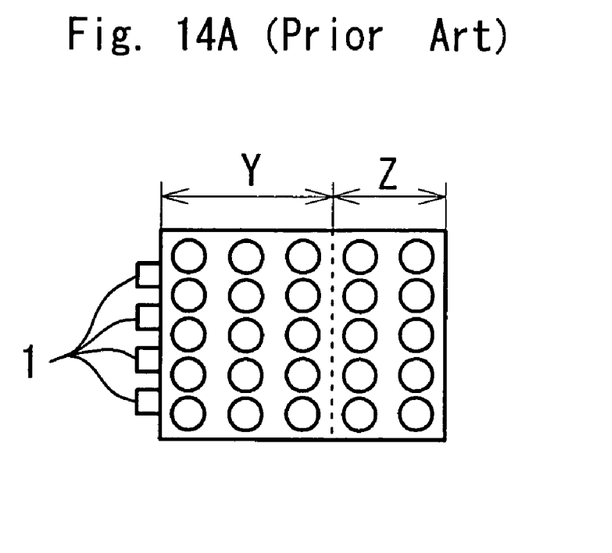
FIGS. 14A and 14B are explanatory views of brightness over an LCD panel having a larger display screen size, which is illuminated by the conventional spread illuminating apparatus of FIG. 13.
Figure 14B:
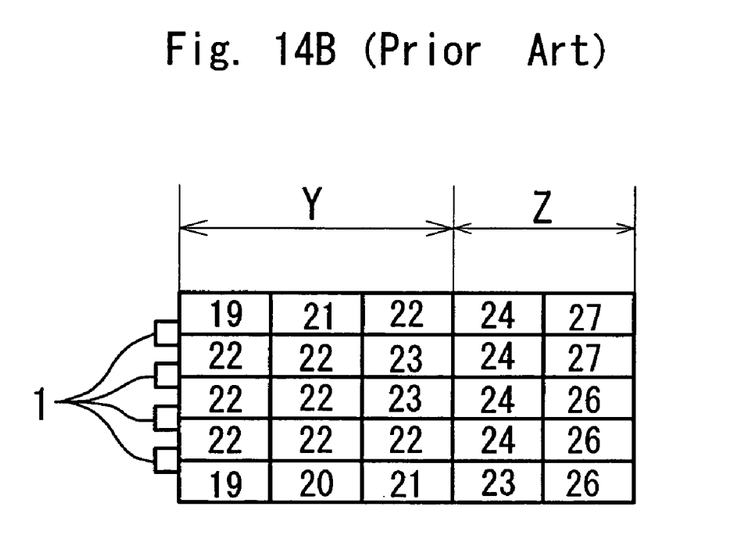

In a 1.8 inch LCD used typically in a portable telephone, which is structured as shown in FIG. 13, for example, four light emitting diodes (LEDs) are disposed as light sources 1 as shown in FIG. 14B which, together with FIG. 14A, explains spot-by-spot brightness over the LCD panel 7A, where brightness of the LCD panel 7A measured at each spot indicated in FIG. 14A is shown in FIG. 14B (figures are relative values of actual measurement). Here, it is to be noted that the LCD panel 7B with a smaller display screen size is disposed away from the light sources 1 unlike shown in FIG. 13. FIG. 14B indicates that brightness is higher at spots located corresponding to the display area Z than at spots located corresponding to the non-display area Y, rendering a maximum difference of 1.4 times. That is, light emitted from the light sources 1 is wasted at the non-display area Y thereby causing uneven brightness over the LCD panel 7A.

SUMMARY OF THE INVENTION

The present invention has been made in light of the problem described above, and it is an object of the present invention to provide a spread illuminating apparatus, which, by fully utilizing light exiting out from both major surfaces of a light conductive plate, illuminates effectively two LCD panels which are provided respectively on the both major surfaces of the light conductive plate, and which have respective display screen sizes different from each other, thereby reducing unevenness in brightness incurred over one LCD panel of the two having a larger display screen size in order to realize an excellent visibility.

In order to achieve the object, according to one aspect of the present invention, a spread illuminating apparatus for illuminating two objects includes: at least one light source; a light conductive plate which has the at least one light source provided at one end surface thereof, and which is adapted to allow light emitted from the at least one light source and introduced therein to exit out therefrom through two major surfaces thereof respectively toward a first crystal display element which constitutes one of the two objects to be illuminated, and which is disposed over one of the two major surfaces of the light conductive plate, and toward a second liquid crystal element which constitutes the other of the two objects to be illuminated, has a smaller display screen size than the first liquid crystal display element, and which is disposed over the other of the two major surfaces of the light conductive plate; and a reflecting means which is disposed at the other major surface of the light conductive plate having the second liquid crystal display element so as to cover at least areas not covered by the second liquid crystal display element, and which reflects light toward the first liquid crystal display element.

In the aspect of the present invention, the reflecting means may be a reflector plate disposed to cover the areas not covered by the second liquid crystal display element.

In the aspect of the present invention, the reflecting means may be a reflective polarizer plate which reflects P-polarized light and transmits S-polarized light selectively, or vice versa.

In the aspect of the present invention, the reflective polarizer plate may have a same polarization plane as a polarizing means provided at a surface of the second liquid crystal display element facing the light conductive plate, and may substitute for the polarizing means.

In the aspect of the present invention, the reflecting means may consist of a reflector plate provided to cover the areas not covered by the second liquid crystal display element; and a reflective polarizer plate which reflects P-polarized light and transmits S-polarized light selectively, or vice versa, and which is provided so as to cover entirely the other major surface of the light conductive plate having the second liquid crystal display element.

In the aspect of the present invention, the reflector plate may have its reflectance matched with reflectance of the second liquid crystal display element.

In the aspect of the present invention, the reflector plate may have its reflectance gradually varying at a given area close to the second liquid crystal display element.

In the aspect of the present invention the reflecting means may be a reflective polarizer plate which reflects P-polarized light and transmits S-polarized light selectively, or vice versa, and which is provided entirely at and in direct contact with the other major surface of the light conductive plate having the second liquid crystal display element.

In the aspect of the present invention, the reflecting means may consist of: a reflector plate provided to cover the areas not covered by the second liquid crystal display element; and a reflective polarizer plate which reflects P-polarized light and transmits S-polarized light selectively, or vice versa, and which is provided entirely at and in direct contact with the other major surface of the light conductive plate having the second liquid crystal display element.

Consequently, in the illuminating apparatus according to the present invention, which has two liquid crystal display elements having respective display screen size different from each other and provided respectively on the both major surfaces of the light conductive plate, light is effectively utilized so as to enhance the brightness of the liquid crystal display elements and to reduce the unevenness in the brightness over the first liquid crystal display element.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE PREFERRED EMBODIMENTS

Figure 1A:
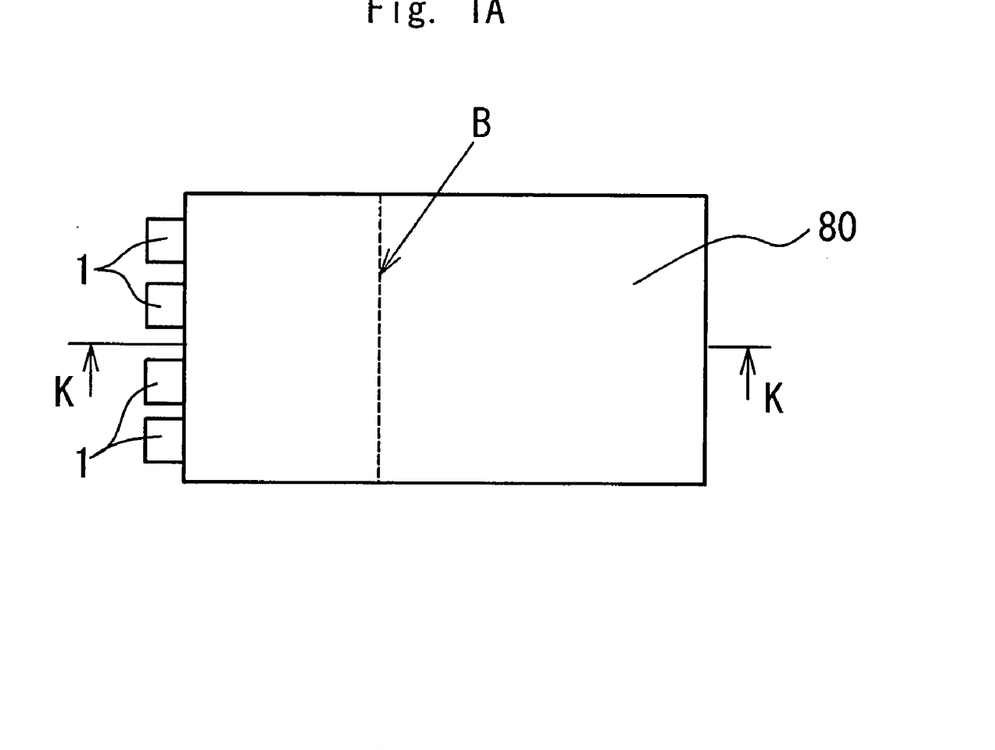
FIG. 1A is a top plan view of a spread illuminating apparatus according to a first embodiment of the present invention.
Figure 1B:
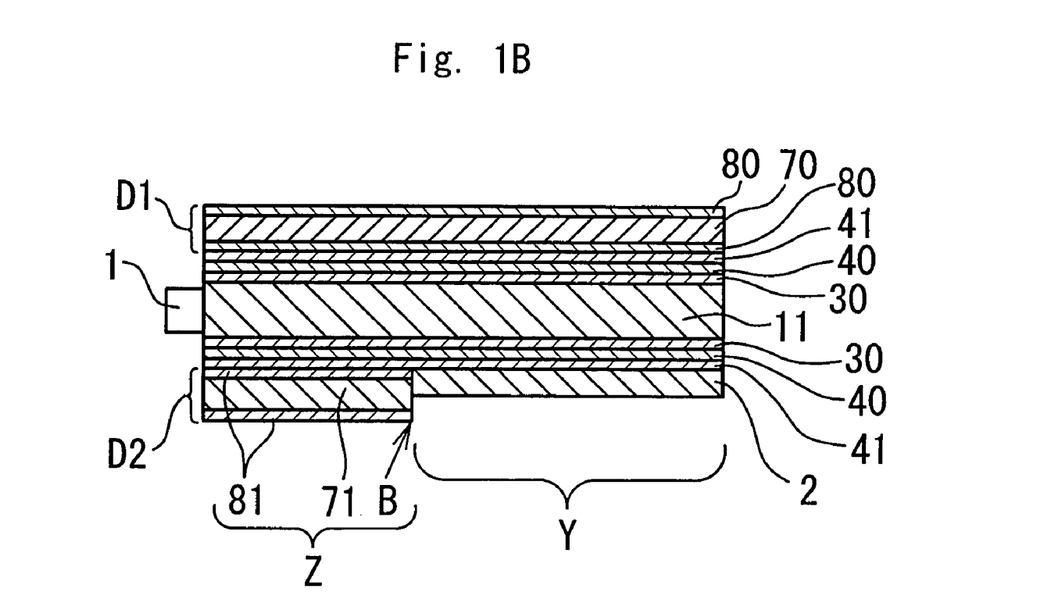
FIG. 1B is a schematic cross sectional view of the FIG. 1A taken along a line K—K.

A first embodiment of the present invention will be described with reference to FIGS. 1A and 1B. A plurality (four in the figure) of light sources 1, such as light emitting diodes (LEDs), are disposed at an end surface of a light conductive plate 11 which is adapted to allow light emitted from the light sources 1 and introduced therein to exit out therefrom through its both major surfaces respectively toward objects to be illuminated. The light conductive plate 11 is made of a highly transparent material, such as glass, polycarbonate, polyester, polymethylmethacrylate, and so forth, and has a well-known dot pattern (not shown) formed on each of the both major surfaces and adapted to scatter light exiting out in order to achieve a substantially uniform emission everywhere from the major surface.

A first LCD panel D1 as an object to be illuminated, which comprises a liquid crystal element 70 and two polarizer sheets 80 formed respectively on both surfaces of the liquid crystal element 70, is disposed on one major surface of the light conductive plate 11, and a second LCD panel D2 as an object to be illuminated, which comprises a liquid crystal element 71 and two polarizer sheets 81 formed respectively on both surfaces of the liquid crystal element 71 and which has a smaller display screen size than the first LCD panel D1, is disposed on the other major surface of the light conductive plate 11. The first and second LCD panels D1 and D2 in the discussion to follow are, for example, TN (twisted nematic) type liquid crystal element which requires two polarizer sheets, but may alternatively be GH (guest house) type or ferroelectric type liquid crystal element which requires one polarizer sheet or does not require any.

The light conductive plate 11 has, on a side toward the second LCD panel D2, an area (hereinafter referred to as non-display area Y) not covered by the second LCD panel D2, and a reflector plate 2 as a reflecting means adapted to reflect light toward the first LCD panel D1 is provided at the non-display area Y. In this connection, an area covered by the second LCD panel D2 is referred to as display area Z. A dashed line indicated by B is a boundary between the reflector plate 2 and the second LCD panel D2. The reflector plate 2 is a plate (film) having its surface coated with a material having a high reflectance, such as silver, but may alternatively be a metallic plate, or a plate of dielectric multilayer film. Further, the reflector plate 2 may be omitted when a housing formed of liquid polymer and so forth, and adapted to hold together the components of the spread illuminating apparatus is structured to function as a reflector plate. The light conductive plate 11 has a well-known diffuser sheet 30 on each of its both major surfaces. The diffuser sheet 30 is formed of a resin material containing light diffusing agent or has a roughened surface and diffuses light so that the dot pattern (not shown) formed on the major surface of the light conductive plate 11 is prevented from being visible to a viewer. The thickness of the diffuser sheet 30 is not specifically determined, but usually 10 μm or more, and preferably 20 to 300 μm. The resin material of the diffuser sheet 30 is not specified as long as it is transparent, and, for example, polycarbonate, polyester, and polymethylmethacrylate are used. At least one of the dot patterns formed respectively on the both major surfaces of the light conductive plate 11 has its configuration and arrangement appropriately modified so as to minimize the difference in brightness resulting from the difference in reflectance between the second LCD panel D2 and the reflector plate 2.

Further, the diffuser sheet 30 has two well-known BEFs (brightness enhancement film) 40 and 41 laminated thereon. BEF is an optical film formed of a highly transparent resin, such as polyester, acrylic resin, and having a precise prism pattern on its surface. When the prism pattern with minute prisms arrayed is put before a backlight, brightness in the frontward direction is enhanced. The BEF 40 and the BEF 41 are laminated with their respective prism patterns oriented orthogonal to each other thereby further enhancing its performance, eliminating wetout (blurring of screen), and suppressing reflective moire (striped pattern formed by portions of light gleaming and portions of light diffused).

Operation of the spread illuminating apparatus according to the first embodiment shown in FIG. 1B will hereinafter be described. Light emitted from the light sources 1 and introduced in the light conductive plate 11 exits out through the both major surfaces of the light conductive plate 11 in two directions toward the first LCD panel D1 (upward in FIG. 1B) and the second LCD panel D2 (downward in FIG. 1B), respectively. Light exiting out toward the first LCD panel D1 is entirely introduced in the first LCD panel D1 and effectively utilized so as to illuminate the first LCD panel D, while light exiting out toward the second LCD D2 is partly introduced in the second LCD panel D2 at the display area Z and effectively utilized so as to illuminate the second LCD panel D2, and is partly reflected by the reflector plate 2 at the non-display area Y to be brought back into the light conductive plate 11 through the BEFs 41 and 40 and the diffuser sheet 30, then introduced in the first LCD panel D1 through the diffuser sheet 30 and the BEFs 40 and 41 and effectively utilized so as to enhance the brightness of the first LCD panel D1. Thus, all the light exiting out from the light conductive plate 11 in the two directions can be effectively utilized without waste. Especially, the light exiting out at the non-display area Y, which is conventionally gone uselessly to be wasted, is now reflected by the reflector plate 2 provided at the non-display area Y and is effectively utilized to increase the brightness of the first LCD panel D1 resulting in reduced unevenness in the brightness of the first LCD panel D1.

Figure 11A:
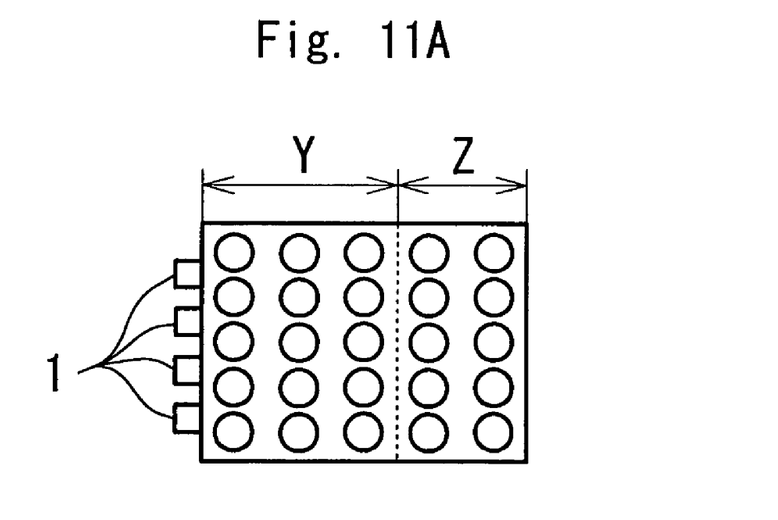
FIGS. 11A and 11B are explanatory views of brightness over an LCD panel having a larger display screen size, which is illuminated by the spread illuminating apparatus of FIG. 1B.
Figure 11B:
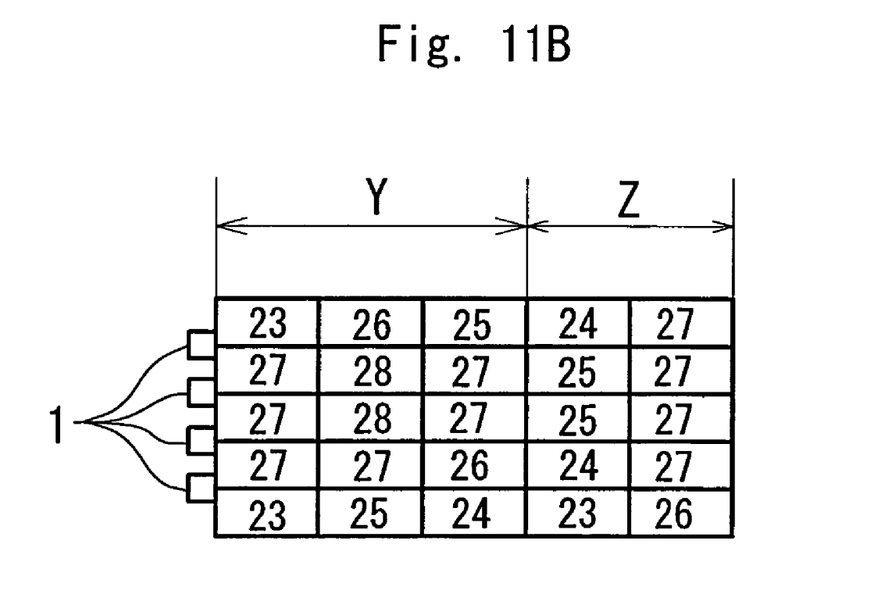

FIGS. 11A and 11B explain spot-by-spot brightness over the first LCD panel D1 in the first embodiment. Here, it is to be noted that the second LCD panel D2 having a smaller display screen size is disposed away from the light sources 1 unlike shown in FIGS. 1A and 1B. Brightness measured at each spot indicated in FIG. 11A is shown in FIG. 11B (figures are relative values of actual measurement). As seen from FIG. 11B, in the first embodiment of the present invention, the spots located corresponding to the non-display area Y have their brightness increased by about 20% compared with the measurement result shown in FIG. 11B, whereby the difference in brightness between the display area Z and the non-display area Y is reduced to 1.02 times, thus proving that the reflector plate 2 is very effective in fully utilizing light which is conventionally wasted. In this connection, when the reflectance of the reflector plate 2 is matched with the reflectance of the second LCD panel D2, the unevenness in brightness can be easily reduced without giving consideration to the dot pattern configuration and arrangement.

The provision of the reflector plate 2 enables enhanced brightness and reduced unevenness in brightness over the first LCD panel D1 as described above, but it may still happen that brightness varies noticeably at the boundary B between the reflector plate 2 and the second LCD panel D2. Even slight difference may occasionally allow a viewer to unwantedly recognize the boundary B. To solve the problem, the reflector plate 2 has a reflectance adjusting means formed at an end area close to the boundary B and adapted to appropriately modify the reflectance at the end area near the boundary B thereby eliminating the problem described above.

Figure 2:
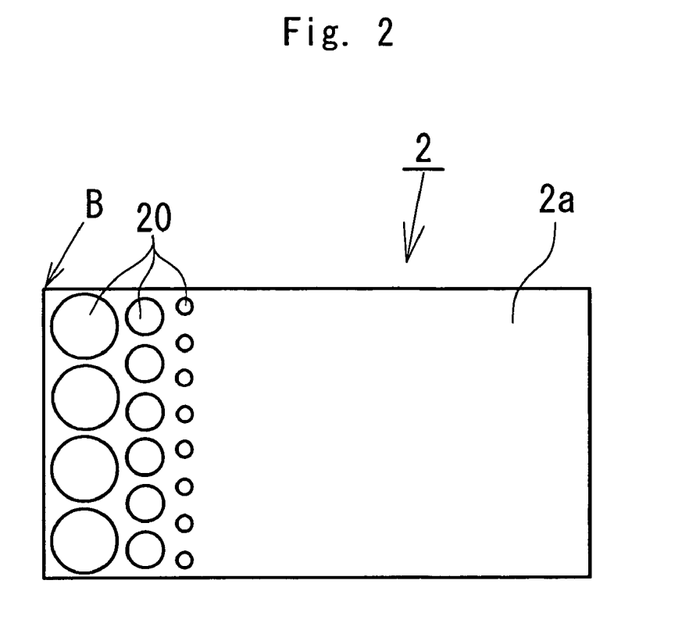
FIG. 2 is a top plan view of a first example of a reflectance adjusting means employed in the present invention.

Referring to FIG. 2, a first example of a reflectance adjusting means comprises a plurality of mechanisms 20 which have a circular shape, are provided on a surface 2a of the reflector plate 2 facing the light conductive plate 11, and which are located at an end area close to the boundary B. The mechanisms 20 are formed by coating the reflector plate 2 with a material, such as white paint, having a lower reflectance than the reflector plate 2. The mechanisms 20 have their area gradually decreasing in accordance with an increase in the distance from the boundary B, whereby the reflector plate 2 has its reflectance gradually decreasing in accordance with a decrease in the distance from boundary B. The size and number of the mechanisms 20 are appropriately determined considering the size and reflectance of the second LCD panel D2 and the size of the light conductive plate 11. The shape of the mechanisms 20 is not limited to circle but may alternatively be rectangle, or other configurations.

Figure 3:
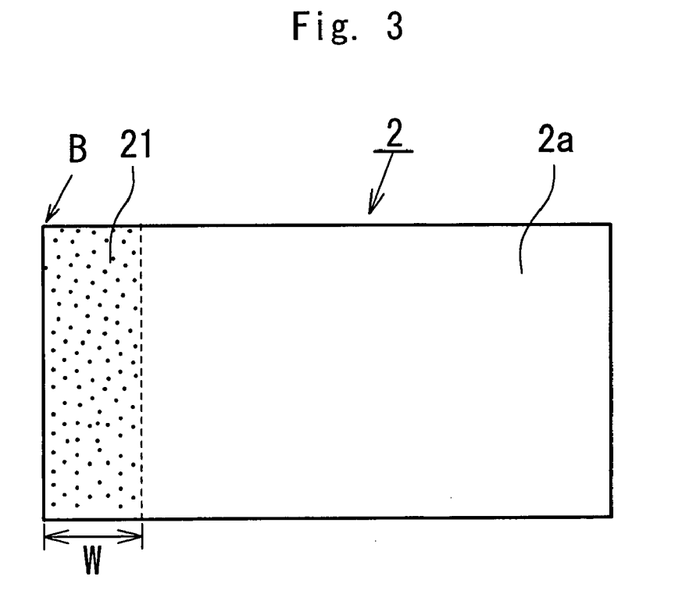
FIG. 3 is a top plan view of a second example of a reflectance adjusting means.

Referring to FIG. 3, a second example of a reflectance adjusting means comprises a strip portion 21 which is provided at a surface 2a of the reflector plate 2 facing the light conductive plate 11, and which is located at an end area close to the boundary B. The strip portion 21 is formed by sticking, on the reflector plate 2, a reflector film, such as a white tape, having a lower reflectance than the reflector plate 2, or by coating the reflector plate 2 with white paint having a lower reflectance than the reflector plate 2 in a strip configuration. The strip portion 21 preferably has its reflectance gradually decreasing in accordance with a decrease in the distance from the boundary B, and has its width W appropriately determined considering the size and reflectance of the second LCD panel D2 and the size of the light conductive plate 11.

Figure 4:
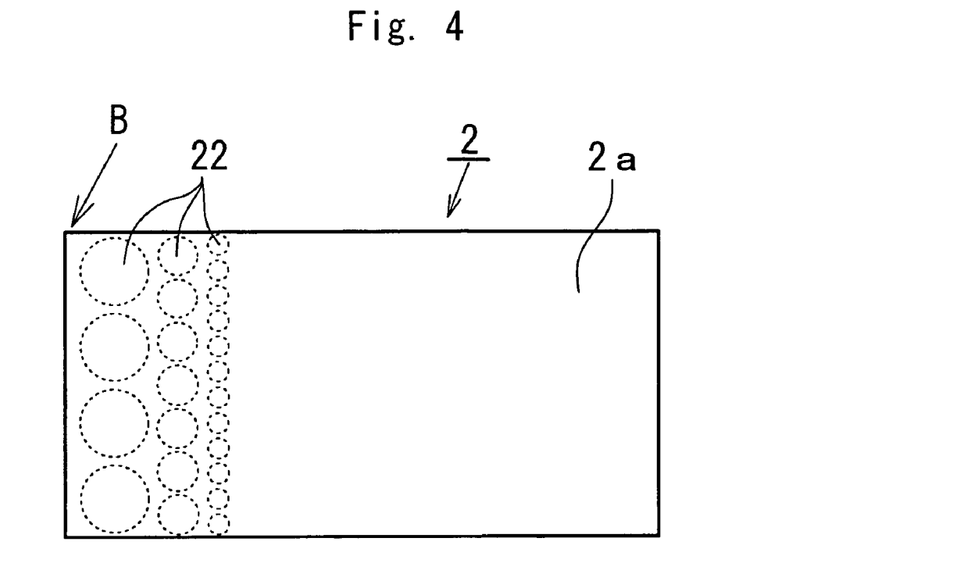
FIG. 4 is a top plan view of a third example of a reflectance adjusting means.

Referring to FIG. 4, a third example of a reflectance adjusting means comprises a plurality of openings 22 which have a circular shape, and which are formed at an end area of the reflector plate 2 close to the boundary B. The openings 22 have their area gradually decreasing in accordance with an increase in the distance from the boundary B, whereby the reflector plate 2 has its reflectance gradually decreasing in accordance with a decrease in the distance from boundary B. The size and number of the openings 20 are appropriately determined considering the size and reflectance of the second LCD panel D2 and the size of the light conductive plate 11. The shape of the openings 22 is not limited to circle but may alternatively be rectangle, or other configurations.

Figure 5:
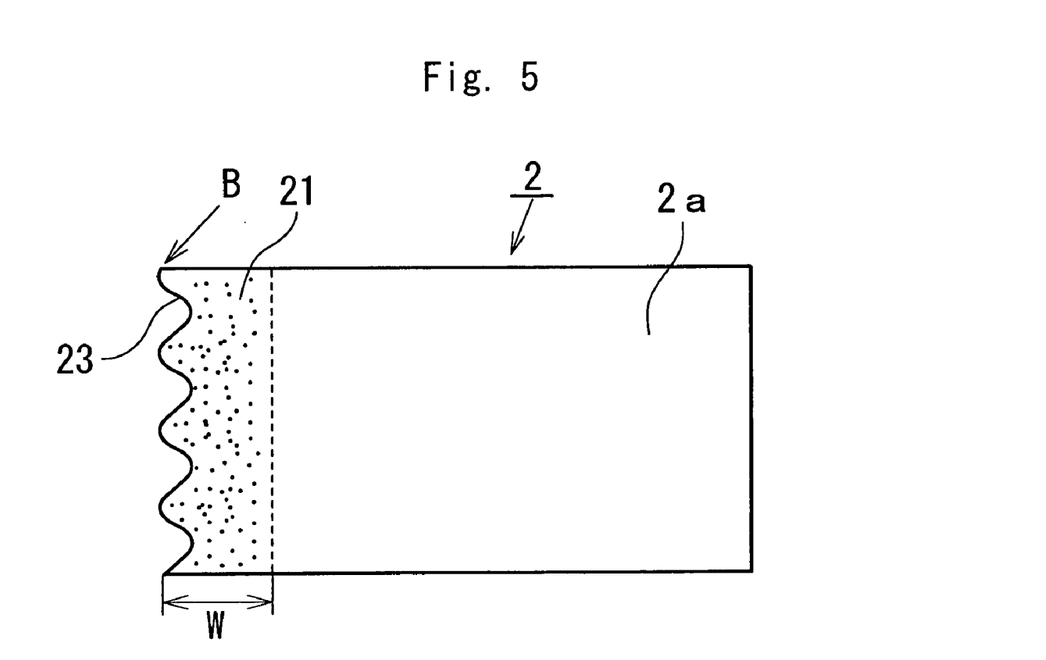
FIG. 5 is a top plan view of a fourth example of a reflectance adjusting means.

Referring to FIG. 5, a fourth example of a reflectance adjusting means comprises the strip portion 21 mentioned in the description of the second example, wherein the end surface of the reflector plate 2 facing the boundary B defines a corrugated configuration 23. The strip portion 21 is formed and structured, and functions in the same way as discussed above in the description of the second example. The magnitude and interval of the corrugated configuration 23 and the width W of the strip portion 21 are appropriately determined considering the size and reflectance of the second LCD panel D2 and the size of the light conductive plate 11. In this connection, the strip portion 21 is not an essential factor and may not necessarily have to be provided if the reflector plate 2 defines the corrugated configuration 23 at its end surface facing the boundary B.

Figure 6:
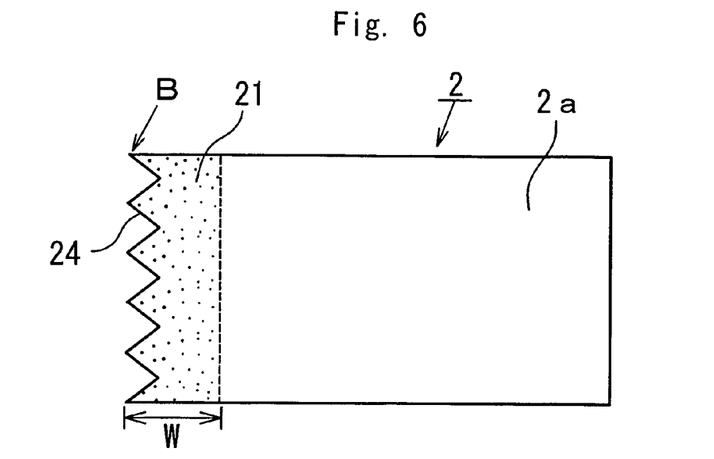
FIG. 6 is a top plan view of a fifth example of a reflectance adjusting means.

Referring to FIG. 6, a fifth example of a reflectance adjusting means comprises the strip portion 21 mentioned in the description of the second example, wherein the end surface of the reflector plate 2 facing the boundary B defines a serrated configuration 24. The strip portion 21 is formed and structured, and functions in the same way as discussed in the description of the second example. The magnitude and interval of the serrated configuration 24 and the width W of the strip portion 21 are appropriately determined considering the size and reflectance of the second LCD panel D2 and the size of the light conductive plate 11. In this connection, the strip portion 21 is not an essential factor and may not necessarily have to be provided if the reflector plate 2 defines the serrated configuration 24 at its end surface facing the boundary B.

A second embodiment of the present invention will hereinafter be described with reference to FIG. 7. In explaining FIG. 7, any component parts corresponding to those in FIG. 1B are denoted by the same reference numerals, and a detailed description thereof will be omitted below. A spread illuminating apparatus according to the second embodiment comprises: a light conductive plate 11 having its both major surfaces functioning as exiting surfaces; light sources 1 disposed at an end surface of the light conductive plate 11; a first LCD panel D1 as an object to be illuminated, which comprises a liquid crystal element 70 and two polarizer plates 80 sandwiching the liquid crystal element 70, and which is disposed on one major surface of the light conductive plate 11; and a second LCD panel D2 as an object to be illuminated, which comprises a liquid crystal element 71 and two polarizer sheets 81 sandwiching the liquid crystal element 71, has a smaller display screen size than the first LCD panel D1, and which is disposed on the other major surface of the light conductive plate 11. And, in the second embodiment, a reflector plate 3 is disposed in place of the reflector plate 2. The reflector plate 3 is a well-known reflective polarizer plate, such as DBEF series by Sumitomo 3M Ltd., which reflects and transmits P-polarized light and S-polarized light selectively. The light conductive plate 11 has a diffuser sheet 30, a BEF 40 and a BEF 41 laminated in this order on each of its both major surfaces, and further has the aforementioned reflector plate 3 laminated over the BEF 41 so as to entirely cover the major surface of the light conductive plate 11 facing toward the second LCD panel D2. The reflector plate 3 is adapted to transmit light having the same polarization plane as light which penetrates through the polarizer sheet 81 provided on the liquid crystal element 71 and to reflect light having other polarization planes.

Operation of the spread illuminating apparatus according to the second embodiment of FIG. 7 will now be described. Light emitted from the light sources 1 and introduced in the light conductive plate 11 exits out entirely from the both major surfaces of the light conductive plate 11 in two directions toward the first LCD panel D1 and the reflector plate 3, respectively.

As for the light exiting out toward the reflector plate 3, light, which has the same polarization plane as light to penetrate the liquid crystal element 71 provided with the polarizer sheets 81, penetrates through the reflector plate 3, while light, which has other polarization planes, is reflected by the reflector plate 3.

The light reflected by the reflector plate 3 is brought back in the light conductive plate 11 via the BEFs 41, 40, and the diffuser sheet 30, progresses further and penetrates through the diffuser sheet 30, and the BEFs 40, 41 into the first LCD panel D1 so as to contribute to uniformly increasing the brightness of the first LCD panel D1. And, the light penetrating through the reflector plate 3 at the second LCD panel D2 is introduced in the second LCD panel D2 so as to illuminate the second LCD panel D2. Thus, the light exiting out from the light conductive plate 11 is effectively utilized such that the brightness of the first LCD panel D1 is increased uniformly by the light reflected by the reflector plate 3 resulting in reduced unevenness in the brightness of the first LCD panel D1. Since the reflector plate 3 having a uniform reflectance overall is placed so as to cover the entire surface of the light conductive plate 11, the second embodiment is more effective in reducing the unevenness in brightness than the first embodiment. Also, since the reflector plate 3 is a reflective polarizer, one polarizer sheet 81 of the two of the second LCD panel D2 facing the light conductive plate 11 can be substituted by the reflector plate 3 and omitted depending on the performance required, thereby contributing to reduction in cost.

Figure 7:
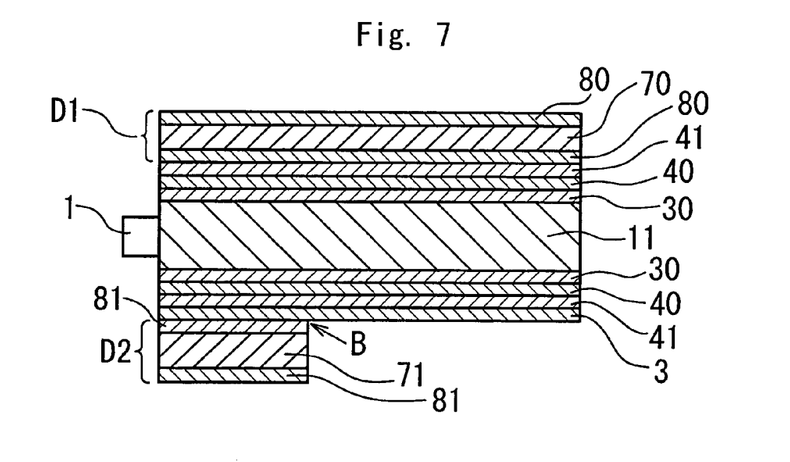
FIG. 7 is a schematic cross sectional view of a spread illuminating apparatus according to a second embodiment of the present invention.
Figure 8:
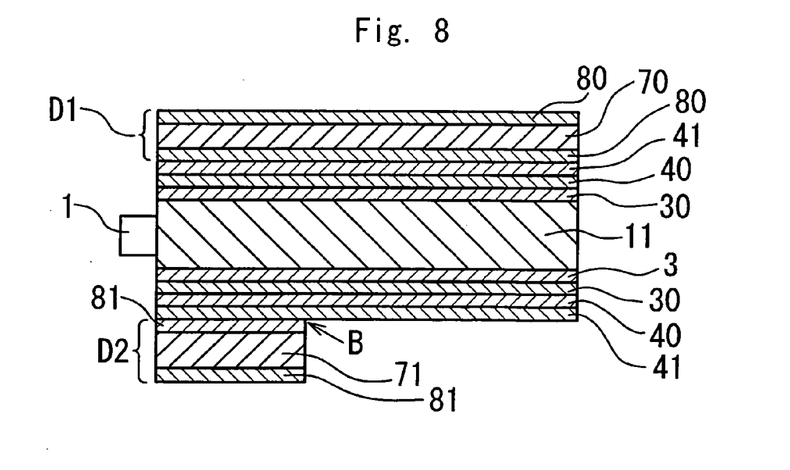
FIG. 8 is a schematic cross sectional view of another example of the second embodiment of FIG. 7.

The reflector plate 3 does not necessarily have to be placed adjacent to the second LCD panel D2 as shown in FIG. 7, but may alternatively be disposed between the light conductive plate 11 and the diffuser sheet 30 as shown in FIG. 8. This structure may possibly contribute to enhancing the visibility of the first LCD panel D1. And, also in this structure, one polarizer sheet 81 of the two of the second LCD panel D2 facing the light conductive plate 11 may be omitted depending on the performance required.

Figure 9:
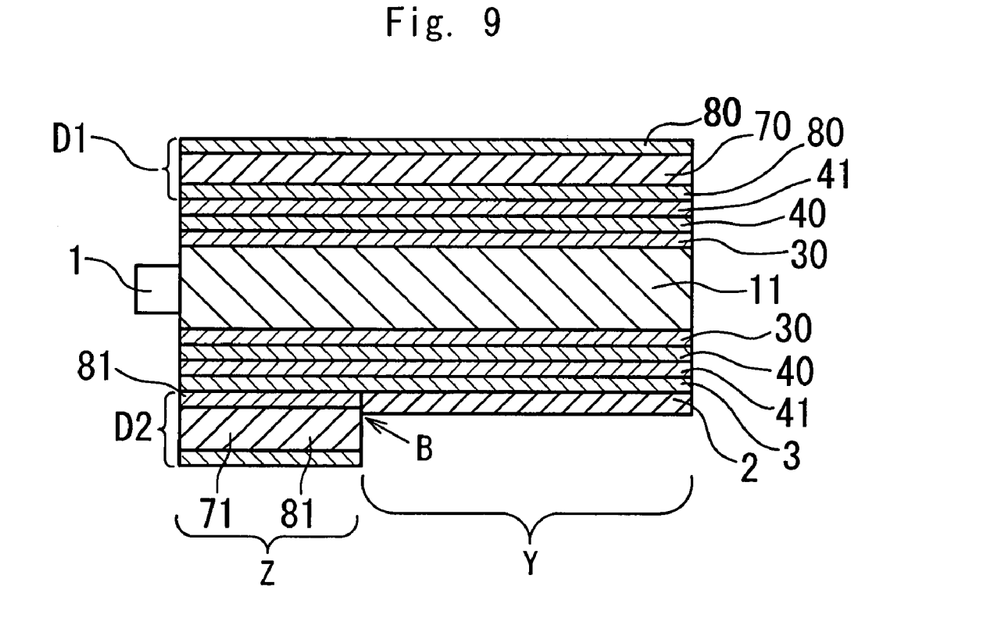
FIG. 9 is a schematic cross sectional view of a spread illuminating apparatus according to a third embodiment of the present invention.

A third embodiment of the present invention will be described with reference to FIG. 9. The third embodiment is a combination of the first and second embodiments described above. Specifically, the reflector plate 3 of the second embodiment is employed in the structure of the first embodiment such that it is placed between the BEF 41 and the second LCD panel D2 plus the reflector plate 2 so as to entirely cover the major surface of the light conductive plate 11. Thus, the non-display area Y is covered by the reflector plate 3 as well as the reflector plate 2. The reflector plates 2 and 3 are explained above and detailed descriptions thereof are omitted.

In the third embodiment, one polarizer sheet 81 of the two of the second LCD panel D2 facing the light conductive plate 11 may be omitted depending on the performance required like in the second embodiment, resulting in contributing to reduction in cost. Further, as discussed in the description of the first embodiment, the reflector plate 2 may have its reflectance matched with the reflectance of the second LCD panel D2 for achieving further uniform brightness of the first LCD panel D1, may be provided with a reflectance adjusting means, and may be omitted when a housing formed of liquid polymer and so forth, and adapted to hold together the components of the spread illuminating apparatus is structured to function as a reflector plate.

Operation of the spread illuminating apparatus according to the third embodiment shown in FIG. 9 will be described. Light emitted from the light sources 1 and introduced in the light conductive plate 11 exits out entirely from the both major surfaces of the light conductive plate 11 in two directions toward the first LCD panel D1 and the reflector plate 3, respectively.

As for the light exiting out toward the reflector plate 3, light, which has the same polarization plane as light to penetrate the liquid crystal element 71 provided with the polarizer sheets 81, penetrates through the reflector plate 3, while light, which has other polarization planes, is reflected by the reflector plate 3.

The light reflected by the reflector plate 3 is brought back in the light conductive plate 11 via the BEFs 41, 40 and the diffuser sheet 30, progresses further and penetrates through the diffuser sheet 30, and the BEFs 40, 41 into the first LCD panel also as to contribute to increasing brightness of the first LCD panel D1. On the other hand, the light penetrating through the reflector plate 3, when incident on the display area Z, is introduced in the second LCD panel D2 so as to illuminate the second LCD panel D2, and when incident on the non-display area Y, is reflected by the reflector plate 2 to be brought back into the light conductive plate 11 via the BEF films 41, 40 and the diffuser sheet 30, and then introduced in the first LCD panel D1 so as to illuminate the first LCD element D1. Thus, all the light exiting out from the light conductive plate 11 is effectively utilized, whereby the brightness of the first LCD panel D1 is increased by the light reflected by the reflector plates 2 and 3 resulting in reduced unevenness in the brightness of the first LCD panel D1.

Figure 10:
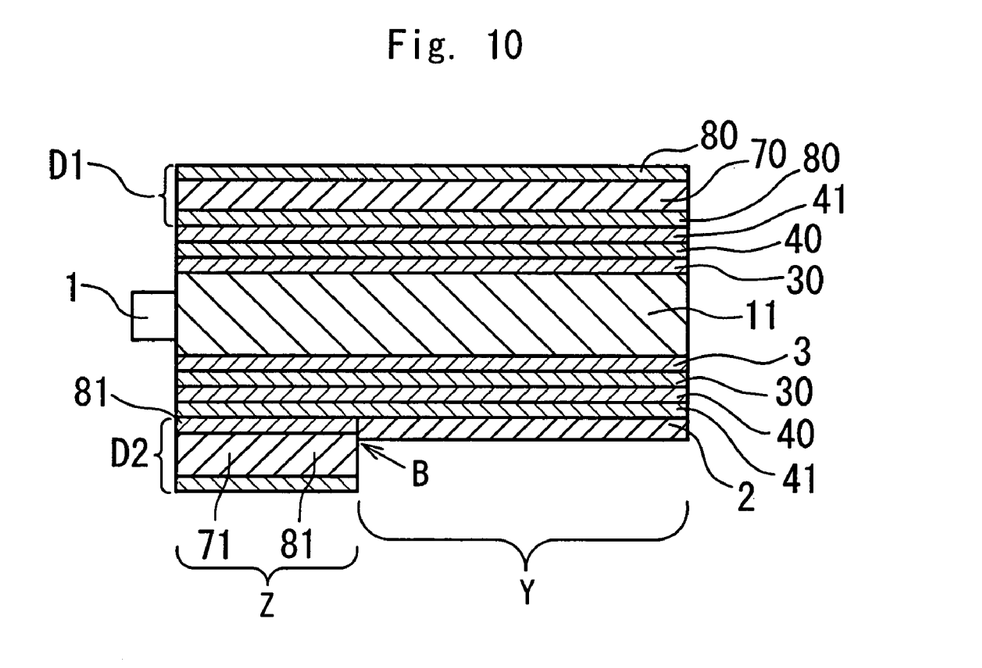
FIG. 10 is a schematic cross sectional view of another example of the third embodiment of FIG. 9.

As described in the explanation of the second embodiment, the reflector plate 3 does not necessarily have to be placed adjacent to the second LCD panel D2, but may alternatively be disposed between the light conductive plate 11 and the diffuser sheet 30 as shown in FIG. 10. Also, one polarizer sheet 81 of the two the second LCD panel D2 facing the light conductive plate 11 may be omitted depending on the performance required In FIGS. 1, and 7 to 10, the second LCD panel D2 having a smaller display screen size than the first LCD panel D1 is disposed to one end of the light conductive plate 11 close to the light sources 1, but may be disposed to the other end away from the light sources 11 as illustrated in FIGS. 11A and 11B. Alternatively, the second LCD panel D2 may be disposed at any places within an area corresponding to the area of the first LCD panel D1, for example, such that the display area Z is sandwiched between two separate non-display areas Y In any cases, the reflector plate is provided to cover at least the non-display area(s) Y defined at a major surface of the light conductive plate 11 facing the second LCD panel D2 so as to reflect light toward the first LCD panel D1. Also, the light conductive plate 11 shown in the embodiments described above has a rectangular cross section but may alternatively have a wedge-shaped cross section, in which case the reflecting means is provided to be aligned to the configuration of the cross section. And, subsidiary optical components, such as the diffuser sheet 30 and BEFs 40, 41 may be selected and arranged as appropriate.

While the present invention has been illustrated and explained with respect to specific embodiments thereof, it is to be understood that the present invention is by no means limited thereto but encompasses all changes and modifications which will become possible within the scope of the appended claims.

What is claimed is:

1. A spread illuminating apparatus for illuminating two objects, the apparatus comprising:
   at least one light source;
   a light conductive plate having the at least one light source provided at one end surface thereof and adapted to allow light emitted from the at least one light source and introduced therein to exit out therefrom through two major surfaces thereof respectively toward a first liquid crystal display element which constitutes one of two objects to be illuminated, and which is disposed over one of the two major surfaces of the light conductive plate, and toward a second liquid crystal display element which constitutes the other of the two objects to be illuminated, has a smaller display screen size than the first liquid crystal display element, and which is partially disposed over the other of the two major surfaces of the light conductive plate, the second liquid crystal display element covering one area, but not covering another area, of the other of the two major surfaces of the light conductive plate; and
   a reflector plate, reflecting light toward the first liquid crystal display element, partially disposed at the other major surface of the light conductive plate having the second liquid crystal display element, the reflector plate covering an area of the other of the two major surfaces that is not covered by the second liquid crystal display element, the reflector plate not covering an area of the other of the two major surfaces that is covered by the second liquid crystal display element,
   wherein the reflector plate has a reflectance that matches with a reflectance of the second liquid crystal display element.

2. A spread illuminating apparatus according to claim 1 wherein the reflector plate has an area partially formed thereon so that the reflectance of the reflector plate gradually decreases according to a distance from the second liquid crystal display element.

3. A spread illuminating apparatus according to claim 1 wherein the reflector plate has its reflectance gradually varying at a given area close to the second liquid crystal display element.

4. A spread illuminating apparatus for illuminating two objects, the apparatus comprising:
   at least one light source;
   a light conductive plate having the at least one light source provided at one end surface thereof and adapted to allow light emitted from the at least one light source and introduced therein to exit out therefrom through two major surfaces thereof respectively toward a first liquid crystal display element which constitutes one of two objects to be illuminated, and which is disposed over one of the two major surfaces of the light conductive plate, and toward a second liquid crystal display element which constitutes the other of the two objects to be illuminated, has a smaller display screen size than the first liquid crystal display element, and which is partially disposed over the other of the two major surfaces of the light conductive plate, the second liquid crystal display element covering one area, but not covering another area, of the other of the two major surfaces of the light conductive plate; and a reflector plate partially provided so as to cover an area of the other of the two major surfaces that is not covered by the second liquid crystal display element, the reflector plate not covering an area of the other of the two major surfaces that is covered by the second liquid crystal display element; and a reflective polarizer plate which reflects P-polarized light and transmits S-polarized light selectively, or vice versa, and which is provided so as to cover entirely the other major surface of the light conductive plate having the second liquid crystal display element, wherein the reflector plate has a reflectance that matches with a reflectance of the second liquid crystal display element.

5. A spread illuminating apparatus according to claim 4 wherein the reflector plate has an area partially formed thereon so that the reflectance of the reflector plate gradually decreases according to a distance from the second liquid crystal display element.

6. A spread illuminating apparatus for illuminating two objects, the apparatus comprising:

at least one light source;

a light conductive plate having the at least one light source provided at one end surface thereof and adapted to allow light emitted from the at least one light source and introduced therein to exit out therefrom through two major surfaces thereof respectively toward a first liquid crystal display element which constitutes one of two objects to be illuminated, and which is disposed over one of the two major surfaces of the light conductive plate, and toward a second liquid crystal display element which constitutes the other of the two objects to be illuminated, has a smaller display screen size than the first liquid crystal display element, and which is partially disposed over the other of the two major surfaces of the light conductive plate, the second liquid crystal display element covering one area, but not covering another area, of the other of the two major surfaces of the light conductive plate; and a reflector plate partially provided so as to cover an area of the other of the two major surfaces that is not covered by the second liquid crystal display element, the reflector plate not covering an area of the other of the two major surfaces that is covered by the second liquid crystal display element, and a reflective polarizer plate which reflects P-polarized light and transmits S-polarized light selectively, or vice versa, and which is provided entirely at and in direct contact with the other major surface of the light conductive plate having the second liquid crystal display element, wherein the reflector plate has a reflectance that matches with a reflectance of the second liquid crystal display element.

7. A spread illuminating apparatus according to claim 6 wherein the reflector plate has an area partially formed thereon so that the reflectance of the reflector plate gradually decreases according to a distance from the second liquid crystal display element.

8. A spread illuminating apparatus for illuminating two objects, the apparatus comprising:

at least one light source;

a light conductive plate having the at least one light source provided at one end surface thereof and adapted to allow light emitted from the at least one light source and introduced therein to exit out therefrom through two major surfaces thereof respectively toward a first liquid crystal display element which constitutes one of two objects to be illuminated, and which is disposed over one of the two major surfaces of the light conductive plate, and toward a second liquid crystal display element which constitutes the other of the two objects to be illuminated, has a smaller display screen size than the first liquid crystal display element, and which is partially disposed over the other of the two major surfaces of the light conductive plate, the second liquid crystal display element covering one area, but not covering another area, of the other of the two major surfaces of the light conductive plate; and a reflector plate, reflecting light toward the first liquid crystal display element, partially disposed at the other major surface of the light conductive plate having the second liquid crystal display element, the reflector plate covering an area of the other of the two major surfaces that is not covered by the second liquid crystal display element, the reflector plate not covering an area of the other of the two major surfaces that is covered by the second liquid crystal display element, wherein the reflector plate has an area facing the light conductive plate and only partially formed at an end area close to a boundary formed between the second liquid crystal display element and the reflector plate, so that the reflectance of the reflector plate gradually decreases according to a distance from the second liquid crystal display element in the area, and wherein the area partially formed on the reflector plate is provided without overlapping any parts of the second liquid crystal display element relative to a back surface of the light conductive plate.

9. A spread illuminating apparatus for illuminating two objects, the apparatus comprising:

at least one light source;

a light conductive plate having the at least one light source provided at one end surface thereof and adapted to allow light emitted from the at least one light source and introduced therein to exit out therefrom through two major surfaces thereof respectively toward a first liquid crystal display element which constitutes one of two objects to be illuminated, and which is disposed over one of the two major surfaces of the light conductive plate, and toward a second liquid crystal display element which constitutes the other of the two objects to be illuminated, has a smaller display screen size than the first liquid crystal display element, and which is partially disposed over the other of the two major surfaces of the light conductive plate, the second liquid crystal display element covering one area, but not covering another area, of the other of the two major surfaces of the light conductive plate; and a reflector plate partially provided so as to cover an area of the other of the two major surfaces that is not covered by the second liquid crystal display element, the reflector plate not covering an area of the other of the two major surfaces that is covered by the second liquid crystal display element; and a reflective polarizer plate which reflects P-polarized light and transmits S-polarized light selectively, or vice versa, and which is provided so as to cover entirely the other major surface of the light conductive plate having the second liquid crystal display element, wherein the reflector plate has an area facing the light conductive plate and only partially formed at an end area close to a boundary formed between the second liquid crystal display element and the reflector plate, so that the reflectance of the reflector plate gradually decreases according to a distance from the second liquid crystal display element in the area, and wherein the area partially formed on the reflector plate is provided without overlapping any parts of the second liquid crystal display element relative to a back surface of the light conductive plate.

10. A spread illuminating apparatus for illuminating two objects, the apparatus comprising:

at least one light source;

a light conductive plate having the at least one light source provided at one end surface thereof and adapted to allow light emitted from the at least one light source and introduced therein to exit out therefrom through two major surfaces thereof respectively toward a first liquid crystal display element which constitutes one of two objects to be illuminated, and which is disposed over one of the two major surfaces of the light conductive plate, and toward a second liquid crystal display element which constitutes the other of the two objects to be illuminated, has a smaller display screen size than the first liquid crystal display element, and which is partially disposed over the other of the two major surfaces of the light conductive plate, the second liquid crystal display element covering one area, but not covering another area, of the other of the two major surfaces of the light conductive plate; and a reflector plate partially provided so as to cover an area of the other of the two major surfaces that is not covered by the second liquid crystal display element, the reflector plate not covering an area of the other of the two major surfaces that is covered by the second liquid crystal display element, and a reflective polarizer plate which reflects P-polarized light and transmits S-polarized light selectively, or vice versa, and which is provided entirely at and in direct contact with the other major surface of the light conductive plate having the second liquid crystal display element, wherein the reflector plate has an area facing the light conductive plate and only partially formed at an end area close to a boundary formed between the second liquid crystal display element and the reflector plate, so that the reflectance of the reflector plate gradually decreases according to a distance from the second liquid crystal display element in the area, and wherein the area partially formed on the reflector plate is provided without overlapping any parts of the second liquid crystal display element relative to a back surface of the light conductive plate.

* * * * *